United States Patent
Nagpal et al.

(10) Patent No.: US 8,335,859 B2
(45) Date of Patent: Dec. 18, 2012

(54) APPARATUS, SYSTEM, AND METHOD FOR EFFICIENT USE OF MIRRORED STORAGE CLOUDS

(75) Inventors: Abhinay R. Nagpal, Pune (IN); Sandeep R. Patil, Pune (IN); Dhaval K. Shah, Pune (IN); Yan W. Stein, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 12/486,513

(22) Filed: Jun. 17, 2009

(65) Prior Publication Data
US 2010/0324751 A1    Dec. 23, 2010

(51) Int. Cl.
*G06F 15/173*    (2006.01)
(52) U.S. Cl. .................. 709/238; 709/239; 718/105
(58) Field of Classification Search .............. 709/238, 709/239; 718/105
See application file for complete search history.

(56) References Cited

U.S. PATENT DOCUMENTS

| | | | |
|---|---|---|---|
| 5,732,215 | A | 3/1998 | Boutaghou et al. |
| 6,405,277 | B1 | 6/2002 | Jen et al. |
| 6,912,599 | B2 | 6/2005 | Sicola et al. |
| 6,954,684 | B2 | 10/2005 | Frankel et al. |
| 7,289,939 | B2 | 10/2007 | Cascaval et al. |
| 2007/0050569 | A1 | 3/2007 | Haustein et al. |
| 2007/0106860 | A1 | 5/2007 | Foster, Sr. et al. |
| 2008/0016279 | A1 | 1/2008 | Clark et al. |
| 2010/0333105 | A1* | 12/2010 | Horvitz et al. ............ 718/105 |

OTHER PUBLICATIONS

IBM Press room, "IBM Project Big Green," http://www-03.ibm.com/press/us/en/presskit/21440.wss, retrieved Apr. 21, 2009.
HDD ID Utility free download, http://www.freedownloadscenter.com/Utilities/Disk_Analysis_Utilities/HDD_ID_Utility, retrieved Apr. 21, 2009.
Weston, Rusty, "Greening the Data Center," Smart Enterprise, http://www.smartenterprisemag.com/articles/2008winter/markettrends2.jhtml, retrieved Apr. 21, 2009.
Software Catalogue, "Hard Disk Temperature Soft," http://www.softplatz.com/software/hard-disk-temperature/, retrieved Apr. 21, 2009.
StorageReview.com, "Self-Monitoring Analysis and Reporting Technology (SMART)," http://www.storagereview.com/guide2000/ref/hdd/perf/qual/featuresSMART.html, retrieved Apr. 21, 2009.

* cited by examiner

*Primary Examiner* — Adnan Mirza
(74) *Attorney, Agent, or Firm* — Kunzler Law Group, PC

(57) ABSTRACT

An apparatus, system, and method are disclosed for distributing data requests between data centers. A request module receives a data operation request from a client. The data operation request corresponds to mirrored data stored at a plurality of data centers. A metadata module maintains a set of data center cooling efficiency factors for each of the plurality of data centers. Each data center cooling efficiency factor comprises data relating to operational costs of a data center. A cost reduction module compares sets of data center cooling efficiency factors for each of the plurality of data centers to select the most efficient data center from the plurality of data centers. A response module sends the data operation request to the selected data center.

23 Claims, 4 Drawing Sheets

APPARATUS, SYSTEM, AND METHOD FOR EFFICIENT USE OF MIRRORED STORAGE CLOUDS

FIELD OF THE INVENTION

This invention relates to mirrored storage clouds and more particularly relates to electrically efficient use of mirrored storage clouds.

BACKGROUND

Description of the Related Art

With an increasing focus on "green" technology, the costs and environmental impacts of data center cooling systems are coming under increased scrutiny. Data center cooling systems increase the amount of electricity needed to power a data center as well as the cost to operate a data center.

As more data and applications move to the cloud, the number and size of data centers are also increasing, further increasing the use of electricity by data centers. The need for reliable access to the increasing amount of remotely stored data is also increasing the amount of data that is being mirrored between multiple data centers for redundancy and stability, further increasing electricity usage and costs.

Many companies are moving data centers to locations with cooler temperatures or that offer cheaper electricity. Others are investigating alternative types of data center cooling systems that offer greater efficiency, cheaper costs, or that have a smaller impact on the environment.

Companies are also developing new data storage technologies, like solid state drives, phase change memory type drives, and racetrack memory technology type drives. Many of these new technologies are more efficient and require less electricity and less cooling than traditional data storage hardware. Other companies are developing hard disk drives that generate less heat and are more efficient than previous versions.

Despite these efforts to increase data center electrical efficiencies, most data centers still use traditional hardware and cooling systems. Even data centers that use more efficient technologies may not be optimized for maximum efficiency.

BRIEF SUMMARY

From the foregoing discussion, it should be apparent that a need exists for an apparatus, system, and method that optimally distribute data requests to mirrored data centers. Beneficially, such an apparatus, system, and method would maximize data center electrical efficiencies.

The present invention has been developed in response to the present state of the art, and in particular, in response to the problems and needs in the art that have not yet been fully solved by currently available data center optimizations. Accordingly, the present invention has been developed to provide an apparatus, system, and method for distributing data requests between data centers that overcome many or all of the above-discussed shortcomings in the art.

The apparatus to distribute data requests between data centers is provided with a plurality of modules configured to functionally execute the necessary steps of data request distribution. These modules in the described embodiments include a request module, a metadata module, a cost reduction module, a response module, an update module, and an override module.

In one embodiment, the request module receives a data operation request from a client. The data operation request corresponds to mirrored data stored at a plurality of data centers, and each of the data centers is capable of fulfilling the data operation request for the client. In a further embodiment, each of the plurality of data centers is geographically separate from each other.

In one embodiment, the metadata module maintains a set of data center cooling efficiency factors for each of the plurality of data centers. Each data center cooling efficiency factor comprises data that relates to operational costs of a data center. In one embodiment, at least one of the data center cooling efficiency factors is a temperature of one or more data storage devices from a data center. The temperature may be an average temperature of data storage devices in a storage array. In a further embodiment, at least one of the data center cooling efficiency factors is a temperature of one or more processors.

In another embodiment, at least one of the data center cooling efficiency factors is an ambient indoor temperature of a data center. At least one of the data center cooling efficiency factors, in one embodiment, comprises a cost of electricity at a data center. In a further embodiment, at least one of the data center cooling efficiency factors is a data storage device efficiency percentage of a data center. In one embodiment, the data storage device efficiency percentage is a percentage of total data storage devices in a data center that comprise one or more efficient types of storage devices, the efficient types of storage devices selected from the group comprising solid state storage devices, phase change memory storage devices, and racetrack memory storage devices. In another embodiment, at least one of the data center cooling efficiency factors is custom defined by a user.

In one embodiment, the metadata module updates at least one of the data center cooling efficiency factors based on a sensor reading. The metadata module, in another embodiment, updates at least one of the data center cooling efficiency factors based on user input.

In one embodiment, the cost reduction module compares sets of data center cooling efficiency factors for each of the plurality of data centers to select a data center from the plurality of data centers. In one embodiment, the response module sends the data operation request to the selected data center.

In one embodiment, the update module causes the cost reduction module to re-compare the sets of data center cooling efficiency factors and reselect a data center from the plurality of data centers. In a further embodiment, the update module causes the cost reduction module to re-compare the sets of data center cooling efficiency factors and reselect a data center in response to the request module receiving a data operation request. In another embodiment, the update module causes the cost reduction module to re-compare the sets of data center cooling efficiency factors and reselect a data center in response to a predetermined amount of time having elapsed. In one embodiment, the override module overrides the selected data center and selects a different data center.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
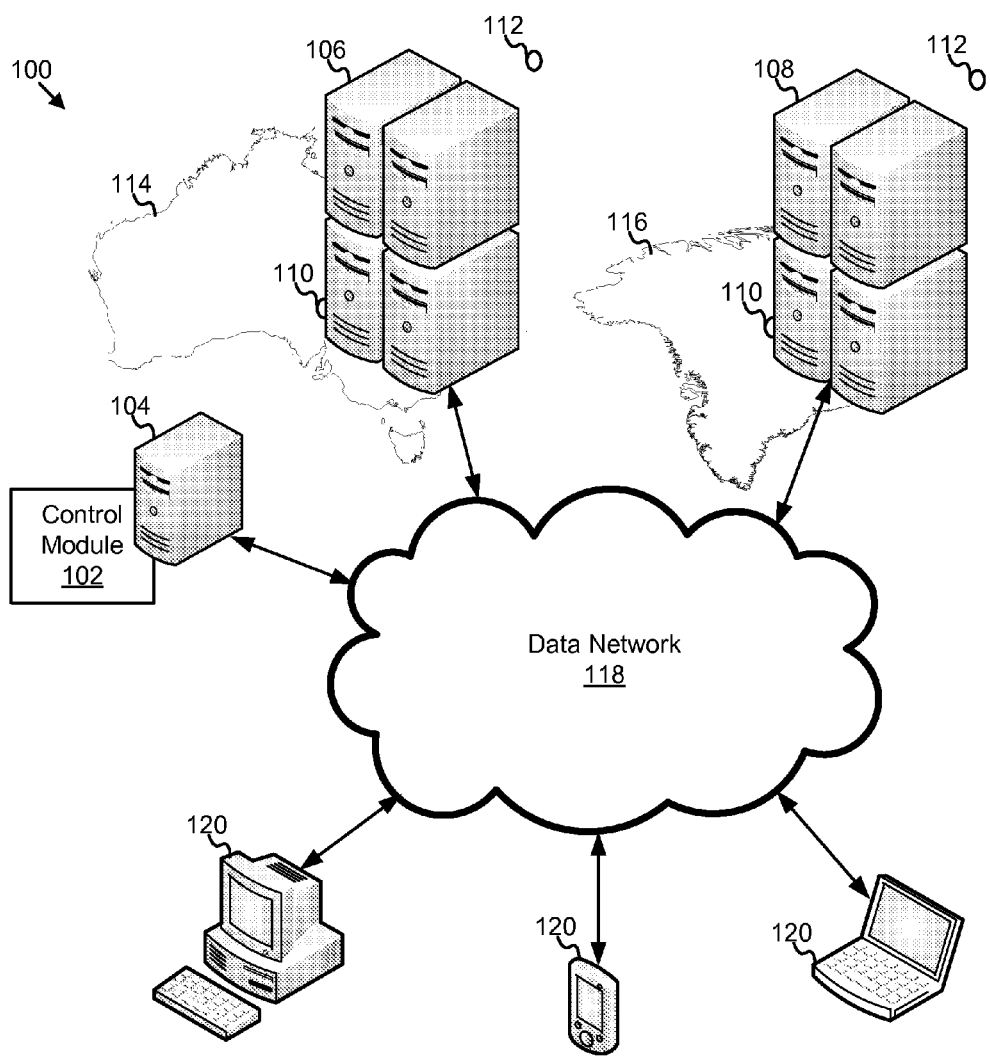
FIG. 1 is a schematic block diagram illustrating one embodiment of a system to distribute data requests between data centers in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts one embodiment of a system 100 to distribute data requests between data centers. In general, the system 100 distributes data requests in a manner that reduces the use of electricity for cooling, and increases electrical efficiency. In the depicted embodiment, the system 100 comprises a control module 102, a control center 104, a first data center 106, a second data center 108, one or more hardware temperature sensors 110, one or more ambient temperature sensors 112, a data network 118, and one or more clients 120.

In the depicted embodiment, the control center 104, the first data center 106, the second data center 108, and the one or more clients 120 are connected to and are in communication through the data network 118. In a further embodiment, the system 100 may comprise more additional data centers that are substantially similar to the first data center 106 and the second data center 108.

The control center 104, in one embodiment, comprises a network connected device, such as a server or other computer device. The control center 104 may be collocated with the first data center 106, with the second data center 108, or may be located elsewhere on the data network 118. The control center 104 acts as a broker between the one or more clients 120, the first data center 106, and the second data center 108.

In one embodiment the control center 104 comprises the control module 102. The control module 102 may comprise hardware and/or software that are installed on or otherwise in communication with the control center 104. One embodiment of the control module 102 is described in greater detail with regard to the control module 200 of FIG. 2. In general, the control module 102 receives data operation requests, such as read, write, and delete operations, for the first data center 106 and the second data center 108 from the one or more clients 120. The control module 102, in one embodiment, compares multiple data center cooling efficiency factors to determine whether to send the data operation requests to the first data center 106 or the second data center 108. By comparing multiple data center cooling efficiency factors, such as data storage device temperatures, ambient indoor data center temperature, cost of electricity, and data storage device efficiency, and the like, the control module 102 distributes data requests such that both data center operational costs and negative environmental effects are minimized.

In one embodiment the first data center 106 and the second data center 108 each comprise data storage facilities connected to the data network 118. The first data center 106 and the second data center 108 each comprise data storage device hardware, such as one or more hard disk drives, optical drives, tape drives, solid state storage devices, phase change memory storage devices, racetrack memory storage devices, and/or other data storage devices that may be integrated with other hardware such as server or other computer hardware. The data storage devices may be arranged in one or more storage arrays, such as a Redundant Array of Independent Disks (RAID) type storage array or the like. The first data center 106 and the second data center 108 may further comprise data storage device cooling systems such as sensors, fans, pumps, and the like.

The first data center 106 and the second data center 108, in one embodiment, each store at least an amount of mirrored or replicated data, substantially exact copies of the mirrored data being stored at both the first data center 106 and the second data center 108. When data is mirrored or replicated, it is available from both the first data center 106 and the second data center 108 over the data network 118, and both the first data center 106 and the second data center 108 are capable of fulfilling data operation requests with regard to the mirrored data. Mirroring or replicating data on the data network 118 may increase stability and performance, facilitate load balancing, and provide other benefits. The mirroring may be automatic, manual, or directed by the control center 104. The first data center 106 and the second data center 108, in one embodiment, store data, applications, and the like, to facilitate cloud computing over the data network 118 for the one or more clients 120. The first data center 106 and the second data center 108 may make the data, applications, and the like available over the data network 118 using a server such as a web server, a file transfer protocol (FTP) server, a database server, a network share server, or another server type.

In one embodiment, the first data center 106 and the second data center 108 are geographically separate, such that one or more data center cooling efficiency factors such as ambient temperature, cost of electricity, and the like, may be different between the first data center 106 and the second data center 108. The first data center 106 and the second data center 108 may be geographically separated by a few feet, such as data centers in different rooms or floors in the same building, or by a large distance, such as data centers in different countries. In the depicted embodiment, the first data center 106 is located in Australia 114 and the second data center 116 is located in Greenland 116. Temperatures would likely be higher in Australia 114 and lower in Greenland 116, while electricity costs may be higher in Greenland 116 and lower in Australia 114 or vice versa. The control module 102 may use data center cooling efficiency factors such as these to determine whether to send the data operation request to the first data center 106 or the second data center 108.

In one embodiment the first data center 106 and the second data center 108 each comprise one or more hardware temperature sensors 110 and one or more ambient temperature sensors 112. The one or more hardware temperature sensors 110, in one embodiment, each measure a temperature of one or more hardware components, such as data storage devices, processors, power supplies, other integrated circuits, and the like. The one or more hardware temperature sensors 110 may be integrated with hardware devices, mounted externally on or near hardware devices, or otherwise disposed near hardware devices such that the hardware temperature sensors 110 may each measure a temperature of one or more hardware devices. The one or more hardware temperature sensors 110 may be manufactured as components of the hardware devices, or may be custom installed at the first data center 106 and the second data center 108. In one embodiment, the one or more hardware temperature sensors 110 comprise data storage device temperature sensors that may measure the temperatures of each data storage device in the first data center 106 and the second data center 108, or a subset of the data storage devices.

The one or more ambient temperature sensors 112, in one embodiment, measure an indoor temperature of the first data center 106 and the second data center 108. In another embodiment, the ambient temperature sensors 112 may measure an outdoor temperature of the first data center 106 and the second data center 108. The one or more hardware temperature sensors 110 and the one or more ambient temperature sensors 112 may be in communication with the control center 104, and may further be in communication with data center cooling systems or the like.

In one embodiment the data network 118 connects the control center 104, the first data center 106, the second data center 108, and the one or more clients 120, facilitating data communications between them. The data network 118 may comprise a global data network, such as the Internet, a private or secure data network, or another type of data network. The data network 118 may be wireless and/or wired, and may be configured to deliver cloud computing data, applications, and the like from the first data center 106 and the second data center 108 to the one or more clients 120.

In one embodiment the one or more clients 120 each comprise a network connected device, such as the depicted desktop computer, personal digital assistant (PDA) or cellular telephone device, and laptop computer. The one or more clients 120 are each configured to send and receive data over the data network 118 and to send data operation requests to the control module 102 relating to data stored at the first data center 106 and the second data center 108. The one or more clients 120 may be located in various locations around the data network 118.

In one embodiment, the control module 102 distributes data requests between the first data center 106 and the second data center 108 over the data network 118 for a customer. The control module 102 receives a data operation request from a client 120 for the customer, and the data operation request corresponds to mirrored data stored by the customer at the first data center 106 and the second data center 108. The customer may provide data center cooling efficiency factors like data storage device temperature information, ambient indoor temperature information, cost of electricity information, and data storage device efficiency information for the first data center 106 and the second data center 108 to the control module 102. The control module 102 may compare the customer provided information to select either the first data center 106 or the second data center 108 as presently more efficient. Providing such a service to a customer will lower the operational costs of the first data center 106 and the second data center 108 as well as lowering the environmental impacts of their operation.

The control module 102, in a further embodiment, may create a relative efficiency report of the first data center 106 and the second data center 108 for the customer. A relative efficiency report may log comparisons that the control module 102 makes, may list a history of data center cooling efficiency factors, or may provide other data center efficiency information to the customer. The control module 102 may further maintain an override list for the customer with override parameters that correspond to predetermined data operation requests.

Figure 2:
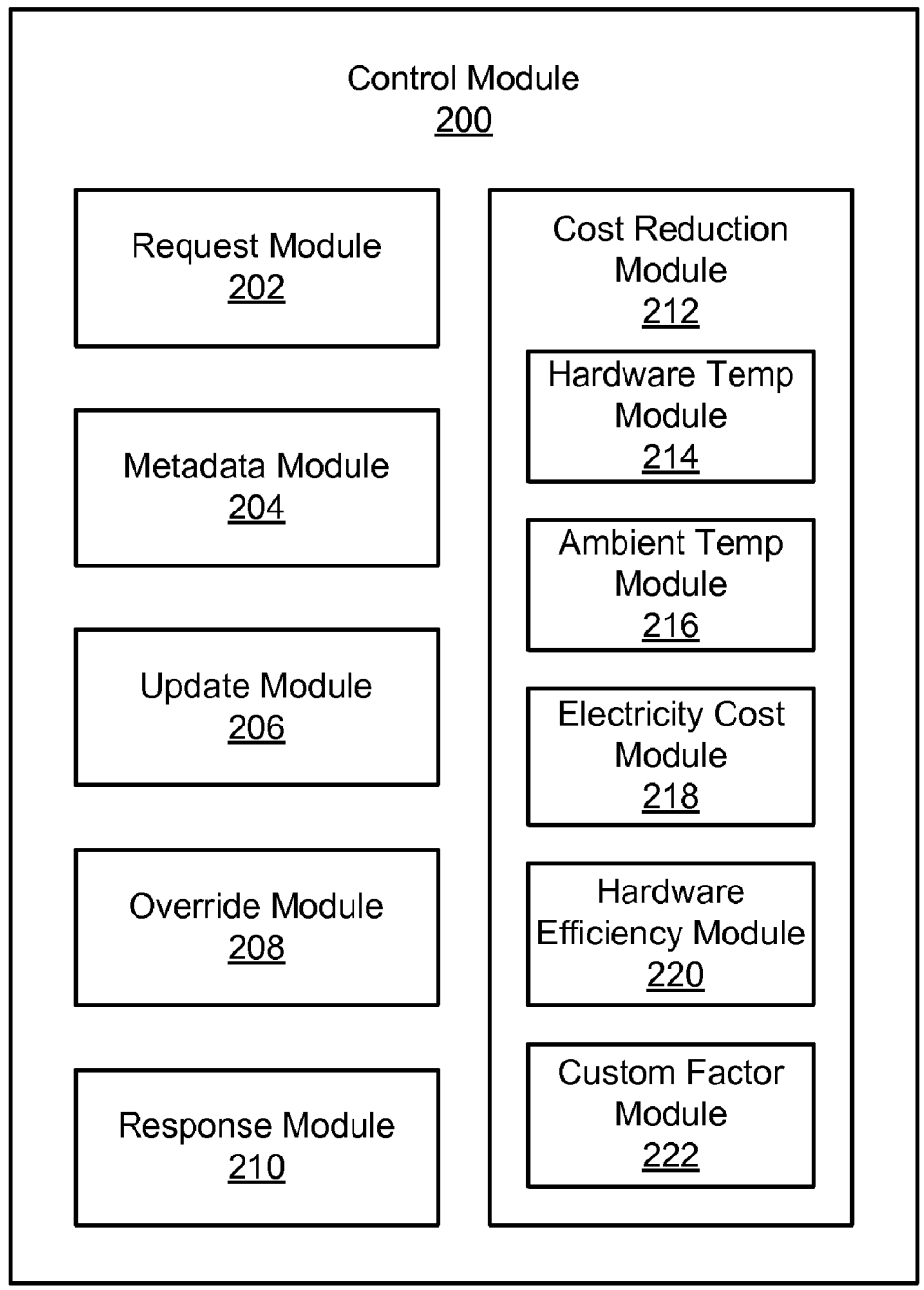
FIG. 2 is a schematic block diagram illustrating one embodiment of a control module to distribute data requests between data centers in accordance with the present invention.

FIG. 2 depicts one embodiment of a control module 200 to distribute data requests between data centers. The control module 200 may, in one embodiment, be substantially similar to the control module 102 of FIG. 1. In the depicted embodiment, the control module 200 comprises a request module 202, a metadata module 204, an update module 206, an override module 208, a response module 210, and a cost reduction module 212.

In one embodiment the request module 202 receives data operation requests from clients. Data operation requests may comprise read requests, write requests, delete requests, or other data request types. Data operation requests may comprise hypertext transfer protocol (HTTP) requests, database operations, FTP commands, file system operations, and other data operation request types. In another embodiment, the request module 202 receives data operation requests that correspond to data that is stored at a plurality of data centers, such that each of the data centers are capable of fulfilling the data operation request for the client. For example, a client may send an HTTP request to the request module 202, and mirrored copies of the webpage or data may be stored on servers at multiple data centers.

In one embodiment the metadata module 204 maintains a set of data center cooling efficiency factors for each data center that the control module 200 controls. Data center cooling efficiency factors comprise data that relates to operational costs of a data center. A few examples of data center cooling efficiency factors are hardware temperatures, ambient data center temperatures, electricity costs, data storage device efficiencies, and the like. Other data center cooling efficiency factors may also relate to data center performance, such as data center distance from a client, network connection costs, network connection speeds, and the like. Data center cooling efficiency factors may further be custom defined by an administrator or other user. The metadata module 204, in a further embodiment, updates data center cooling efficiency factors used by the control module 200. The metadata module 204 may maintain the data center cooling efficiency factors in a data storage that is accessible to the control module 200.

The metadata module 204 may receive data center cooling efficiency factor updates automatically from sensors located at data centers, may receive them from users as user input, may contact one or more servers to retrieve data center cooling efficiency factors, or may otherwise retrieve or receive updated data center cooling efficiency factors. For example, the metadata module 204 may query a data center for one or more data storage device temperatures, ambient indoor data center temperatures, electricity costs, data storage device efficiency percentages, and the like. A data center may also send updates to the metadata module 204 without a query, based on a schedule, in response to an event such as a change in the value of a data center cooling efficiency factor, or the like. The metadata module 204, in one embodiment, may receive user input directly from a user, such as data center electricity costs or data storage device efficiency percentages, or the metadata module 204 may receive user input that is entered at a data center or other network connected device and relayed to the metadata module 204. The metadata module 204, in a further embodiment, may contact a server, such as a utility company server, to access a data center cooling efficiency factor. In one embodiment, the metadata module 204 may manipulate the data center cooling efficiency factors before storing them by normalizing, standardizing, scaling, weighting, or otherwise adjusting the data.

In one embodiment the update module 206 causes the cost reduction module 212 to re-compare sets of data center cooling efficiency factors to determine which data center the control module 200 should send data operation requests to. The update module 206, in one embodiment, may cause the cost reduction module 212 to re-compare the sets of data center cooling efficiency factors in response to each data operation request that the request module 202 receives. In a further embodiment, the update module 206 may cause the cost reduction module 212 to re-compare the sets in response to a predetermined amount of time having elapsed since the cost reduction module 212 last compared the sets, or the like. In general, the more often that the cost reduction module 212 compares the sets of data center cooling efficiency factors, the more accurately the cost reduction module 212 can determine which data center is more efficient, but the less often that the cost reduction module 212 compares the sets, the more efficient the cost reduction module 212 and the control module 200 are.

In one embodiment the override module 208 overrides the data center that the cost reduction module 212 selects and selects a different data center. The override module 208, in one embodiment, may override the cost reduction module 212's selection based on a data operation request that the request module 202 receives. The override module 208, in a further embodiment, may override the cost reduction module 212's selected data center in response to the data operation request relating to a predetermined type of data, coming from a predetermined client, coming from a predetermined geographic location, containing a predetermined flag or marker, or based on other criteria. For example, the override module 208 may override the cost reduction module 212's selection for streaming video or another time sensitive data type, selecting a data center based on geographic proximity or on other factors instead of on cooling efficiency.

In one embodiment the response module 210 sends one or more data operation requests to the data center that the cost reduction module 212 or the override module 208 selects. The response module 210 may send the one or more data operation requests directly to the selected data center, may direct the requesting client to the selected data center, may respond to the requesting client directly based on data from the selected data center, or may otherwise facilitate communications between the requesting client and the selected data center.

In one embodiment, the cost reduction module 212 compares sets of data center cooling efficiency factors with each other to select a data center to fulfill a data operation request for a client. Each set of data center cooling efficiency factors corresponds to a data center and represents operational cost statistics for the corresponding data center. As described above, the metadata module 204, in one embodiment, maintains the sets of data center cooling efficiency factor data that the cost reduction module 212 compares. In one embodiment, the cost reduction module 212 uses the data that the metadata module 204 stores directly. In a further embodiment, the cost reduction module 212 manipulates the data that the metadata module 204 stores before using it in a comparison, such as normalizing, standardizing, scaling, weighting, or otherwise adjusting the data.

In one embodiment the cost reduction module 212 compares the sets of data center cooling efficiency factors by determining the product of a plurality of differential values, each differential value representing the difference in a data center cooling efficiency factor between two data centers. The cost reduction module 212 may weight one or more of the differential values in the comparison based on an importance assigned to the corresponding data center cooling efficiency factor, or based on some normalization value. The differential values, in one embodiment, may each comprise a percentage, such as a percentage difference between data center cooling efficiency factors, or a percentage difference between a data center cooling efficiency factor and a base value. Using percentages in the comparison normalizes the values such that each differential has similar units and scale, regardless of the original units or scale of the data center cooling efficiency factor. The result of the comparison, in one embodiment, represents a probability that the cost reduction module 212 will select a specific data center, or a probability that the cost reduction module 212 will switch a determination from a default data center to another data center. In one embodiment, the cost reduction module 212 includes nonzero differentials in the comparison but does not include differentials that are zero, meaning that the corresponding data center cooling efficiency factors are equal.

In one embodiment, if there are two data centers that are storing mirrored data corresponding to a data operation request, the cost reduction module 212 compares the data center cooling efficiency factors for those two data centers directly to each other. If there are more than two data centers that are storing the mirrored data, then the cost reduction module 212 may make multiple comparisons, comparing two data centers and then comparing the more efficient of those two data centers to a third data center and so on, or the cost reduction module 212 may compare each data center to a set of base data center cooling efficiency factor values to determine which data center is most efficient.

In one embodiment the cost reduction module 212 comprises a hardware temperature module 214, an ambient temperature module 216, an electricity cost module 218, a hardware efficiency module 220, and a custom factor module 222. In a further embodiment, the hardware temperature module 214, the ambient temperature module 216, the electricity cost module 218, the hardware efficiency module 220, and the custom factor module 222 each correspond to a data center cooling efficiency factor. As described above, the metadata module 204 maintains the data center cooling efficiency factor data for use by the hardware temperature module 214, the ambient temperature module 216, the electricity cost module 218, the hardware efficiency module 220, and the custom factor module 222.

In one embodiment the hardware temperature module 214 compares temperatures of one or more hardware devices located at each of the data centers. The temperatures may be a temperature of a single hardware device from each of the data centers, or an average temperature from multiple devices from each of the data centers. The temperatures may be data storage device temperatures, processor temperatures, power supply temperatures, other integrated circuit temperatures, or other hardware device temperatures.

In one embodiment the ambient temperature module 216 compares ambient temperatures of each of the data centers. The ambient temperature may be an indoor temperature of the data centers, such as a server room temperature or the like, or the ambient temperature may be an outdoor temperature at the data centers or in the general geographic area of the data centers. For example, the ambient temperature module 216 may compare temperatures measured by temperature sensors at each data center, or may compare temperatures obtained from a weather service or the like.

In one embodiment the electricity cost module 218 compares electricity costs for each of the data centers. The electricity costs that the electricity cost module 218 receives from the metadata module 204 may be manually entered data from a user, or may be retrieved directly from the data centers' electricity providers.

In one embodiment the hardware efficiency module 220 compares an efficiency statistic of some specific hardware used by each data center. For example, the hardware efficiency module 220 may compare data storage device efficiency percentages, processor efficiencies, or the like for each data center. In one embodiment, the hardware efficiency module 220 compares data storage device efficiency percentages that are the percentage of total data storage devices in each data center that are an efficient type of storage device, such as solid state storage devices, phase change memory storage devices, racetrack memory storage devices, and the like. Solid state storage devices usually store data using flash memory or another type of integrated circuit based storage, and have few if any moving parts.

In one embodiment the custom factor module 222 compares one or more data center cooling efficiency factors that are custom defined by a user. An administrator of the control module 200 may wish to include a data center cooling efficiency factor that is not considered by default, such as a data performance factor like latency, data center distance from client, data connection costs, or other factors. The custom factor module 222 compares one or more of these user defined data center cooling efficiency factors for the user.

In one embodiment, the hardware temperature module 214, the ambient temperature module 216, the electricity cost module 218, the hardware efficiency module 220, and the custom factor module 222 each determine a differential, such as a percentage or other normalized value, and the cost reduction module 212 multiplies each differential that is nonzero to produce a result. The differentials may be calculated relative to a default value or relative to another data center. The result may be an efficiency metric of one of the data centers. If the product of the differentials, the efficiency metric, is above a predetermined threshold, that may be a default value or a user defined value, the cost reduction module 212 may select a specific data center, otherwise the cost reduction module 212 may select a different data center. For example, the cost reduction module 212 may use the following formula, or a similar formula, to determine a value to compare with a predetermined threshold value:

$$S=dT*dC*dA*dE$$

In the formula, S is the efficiency metric of a data center, dT is a hardware temperature differential, dC is an electricity cost differential, dA is an ambient temperature differential, and dE is a hardware efficiency differential. Each differential comprises either a nonzero value or the differential is not included in the formula. The differentials may be scaled, normalized, or otherwise manipulated such that S is optimally weighted. In another embodiment, the differentials may be added instead of multiplied. Depending on whether the differentials are calculated relative to another data center or relative to default values, the cost reduction module 212 may either compare S to a threshold value or to an S value determined for another data center to select an optimally efficient data center. For example, the cost reduction module 212 may select a data center having a higher efficiency metric than another data center, or the cost reduction module 212 may select a predefined data center if the efficiency metric is above a threshold value, for example where the efficiency metric is comparing multiple data centers.

Figure 3:
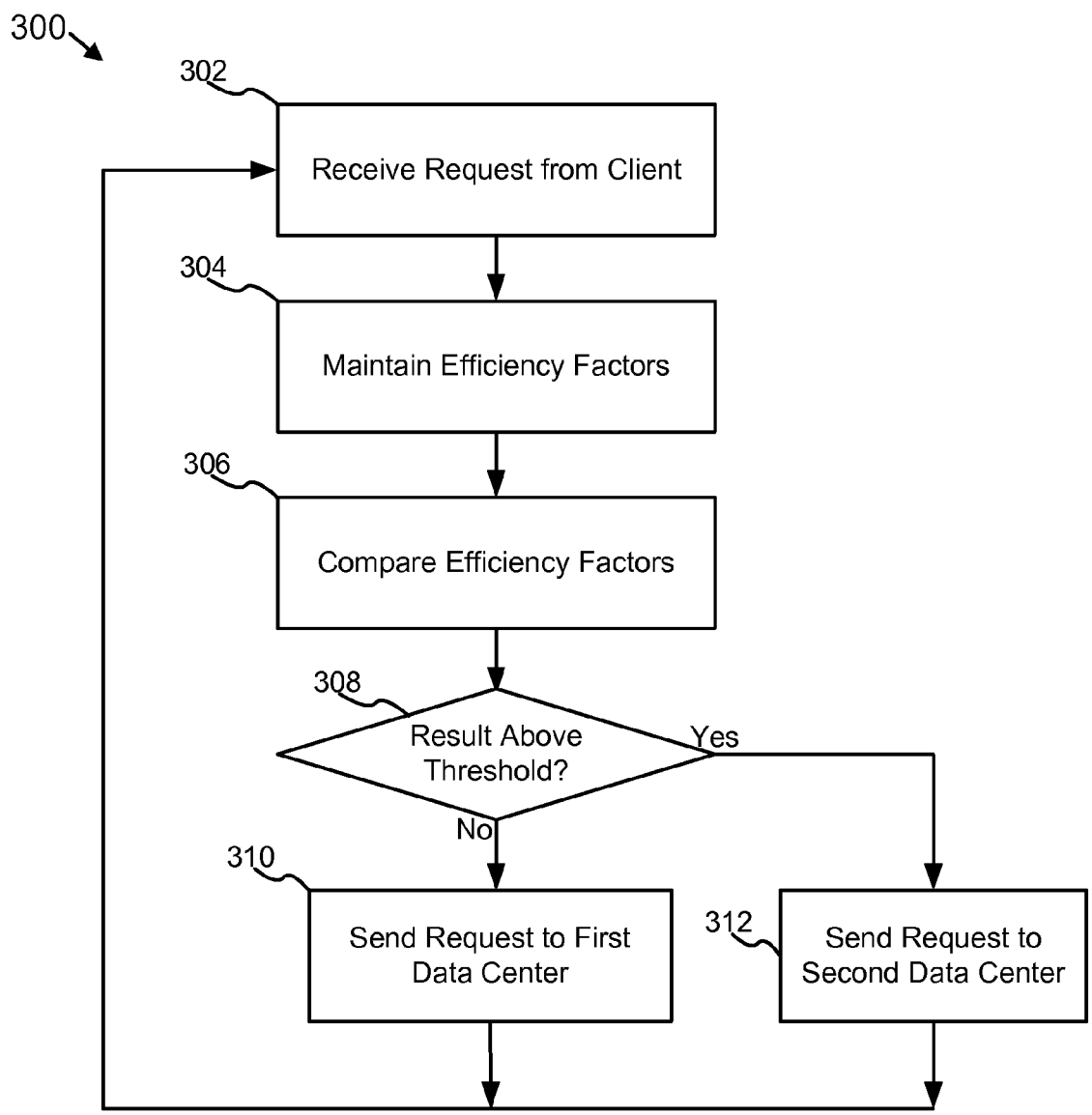
FIG. 3 is a schematic flow chart diagram illustrating one embodiment of a method for distributing data requests between data centers in accordance with the present invention.

FIG. 3 is a schematic flow chart diagram illustrating one embodiment of a method 300 for distributing data requests between data centers. The method 300 begins. The request module 202 receives 302 a data operation request from a client 120. The data operation request corresponds to data that is mirrored and stored on both the first data center 106 and the second data center 108. The metadata module 204 maintains 304 a set of data center cooling efficiency factors for the first data center 106 and a set of data center cooling efficiency factors for the second data center 108.

The cost reduction module 212 compares 306 the set of data center cooling efficiency factors for the first data center 106 with the set of data center cooling efficiency factors for the second data center 108 to determine an efficiency comparison result. The cost reduction module 212 determines 308 whether the result is above a predetermined threshold value. If the result is not above the threshold value, the response module 210 sends 310 the data operation request to the first data center 106. If the result is above the threshold value, the response module 210 sends 312 the data operation request to the second data center 108. The method 300 returns to the receiving step 302.

Figure 4:
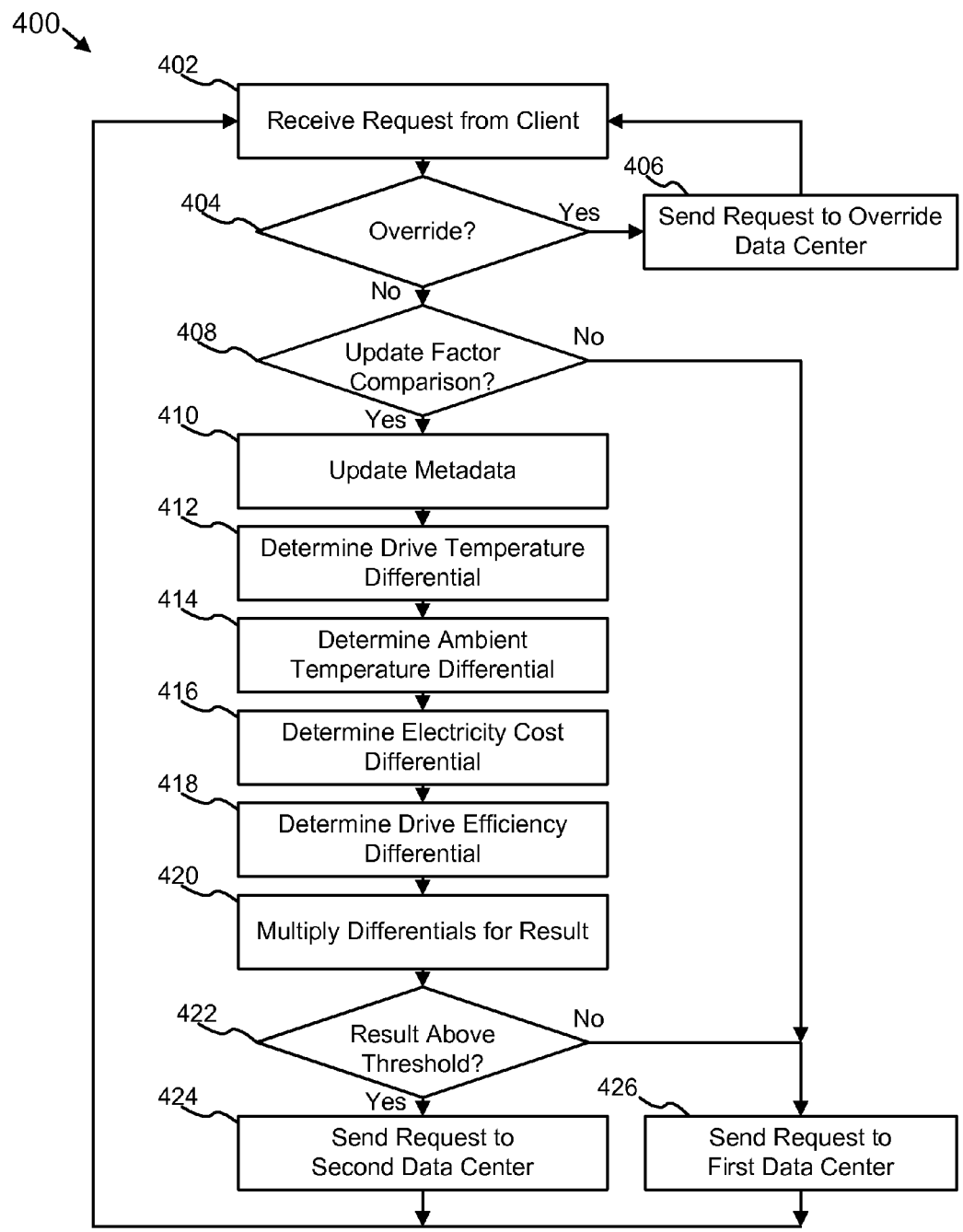
FIG. 4 is a schematic flow chart diagram illustrating another embodiment of a method for distributing data requests between data centers in accordance with the present invention.

FIG. 4 is a schematic flow chart diagram illustrating another embodiment of a method 400 for distributing data requests between data centers. The method 400 begins. The request module 202 receives 402 a data operation request from a client 120. The data operation request corresponds to data that is mirrored and stored on both the first data center 106 and the second data center 108.

The override module 208 determines 404 based on the data operation request whether to override the data center selection with a predetermined override data center that is either the first data center 106 or the second data center 108. If the override module 208 determines to override the data center selection, the response module 210 sends 406 the data operation request to the predetermined override data center.

If the override module 208 determines not to override the data center selection, the update module 206 determines 408 whether the cost reduction module 212 should update the comparison of data center cooling efficiency factors. If the update module 206 determines that the cost reduction module 212 should not update the comparison of data center cooling efficiency factors, the response module 210 sends 426 the data operation request to the first data center 106, either as the default data center, or as the data center selected in the previous comparison.

If the update module 206 determines that the cost reduction module 212 should update the comparison of data center cooling efficiency factors, the metadata module 204 updates 410 a set of data center cooling efficiency factors for the first data center 106 and a set of data center cooling efficiency factors for the second data center 108. The hardware temperature module 214 determines 412 a data storage device temperature differential. The ambient temperature module 216 determines 414 an ambient temperature differential. The electricity cost module 218 determines 416 an electricity cost differential. The hardware efficiency module 220 determines 418 a data storage device efficiency differential. In another embodiment, the custom factor module 222 may also determine one or more custom factor differentials.

The cost reduction module 212 multiplies 420 the nonzero values of the data storage device temperature differential, the ambient temperature differential, the electricity cost differential, the data storage device efficiency differential, and, in one embodiment, one or more custom factor differentials to determine an efficiency comparison result. The cost reduction module 212 determines 422 whether the result is above a predetermined threshold value. If the result is not above the threshold value, the response module 210 sends 426 the data operation request to the first data center 106. If the result is above the threshold value, the response module 210 sends 424 the data operation request to the second data center 108. The method 400 returns to the receiving step 402.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for distributing data requests between data centers, the method comprising:
   receiving a data operation request from a client, the data operation request corresponding to mirrored data stored at a plurality of data centers, each of the data centers capable of fulfilling the data operation request for the client;
   maintaining a set of data center cooling efficiency factors for each of the plurality of data centers, each data center cooling efficiency factor comprising data relating to operational costs of a data center, at least one of the data center cooling efficiency factors comprising a data storage device efficiency percentage comprising a percentage of data storage devices in a data center that comprise one or more efficient types of storage devices; and
   selecting, in response to receiving the data operation request, a data center from the plurality of data centers to fulfill the data operation request, the selection based on a comparison of the data center cooling efficiency factors.

2. The method of claim 1, wherein each of the plurality of data centers is geographically separate from each other.

3. The method of claim 1, wherein at least one of the data center cooling efficiency factors comprises a temperature of one or more data storage devices of a data center.

4. The method of claim 3, wherein the temperature comprises an average temperature of data storage devices in a storage array.

5. The method of claim 1, wherein at least one of the data center cooling efficiency factors comprises a temperature of one or more processors.

6. The method of claim 1, wherein at least one of the data center cooling efficiency factors comprises an ambient indoor temperature of a data center.

7. The method of claim 1, wherein at least one of the data center cooling efficiency factors comprises a cost of electricity at a data centers.

8. The method of claim 1, wherein the efficient types of storage devices are selected from the group consisting of solid state storage devices, phase change memory storage devices, and racetrack memory storage devices.

9. The method of claim 1, wherein at least one of the data center cooling efficiency factors is custom defined by a user.

10. The method of claim 1, further comprising overriding the selected data center and selecting a different data center based on the data operation request.

11. An apparatus to distribute data requests between data centers, the apparatus comprising:
- a request module configured to receive a data operation request from a client, the data operation request corresponding to mirrored data stored at a plurality of data centers, each of the data centers capable of fulfilling the data operation request for the client;
- a metadata module configured to maintain a set of data center cooling efficiency factors for each of the plurality of data centers, each data center cooling efficiency factor comprising data relating to operational costs of a data center, at least one of the data center cooling efficiency factors comprising a data storage device efficiency percentage comprising a percentage of data storage devices in a data center that comprise one or more efficient types of storage devices; and
- a cost reduction module configured to select, in response to the request module receiving the data operation request, a data center from the plurality of data centers to fulfill the data operation request, the selection based on a comparison of the data center cooling efficiency factors.

12. The apparatus of claim 11, wherein the metadata module is configured to update at least one of the data center cooling efficiency factors based on a sensor reading.

13. The apparatus of claim 11, further comprising an update module configured to cause the cost reduction module to re-compare the sets of data center cooling efficiency factors and reselect a data center from the plurality of data centers in response to the request module receiving a data operation request.

14. The apparatus of claim 11, further comprising an update module configured to cause the cost reduction module to re-compare the sets of data center cooling efficiency factors and reselect a data center from the plurality of data centers in response to a predetermined amount of time having elapsed.

15. The apparatus of claim 11, further comprising an override module configured to override the selected data center and select a different data center in response to user input.

16. A system to distribute data requests between data centers, the system comprising:
- a plurality of data centers, each of the plurality of data centers geographically separate from each other;
- one or more temperature sensors disposed at each of the plurality of data centers, the one or more temperature sensors comprising at least one ambient temperature sensor disposed at each of the plurality of data centers and at least one data storage device temperature sensor disposed at each of the plurality of data centers; and
- a control module configured to receive a data operation request from a client, the data operation request corresponding to mirrored data stored at the plurality of data centers, each of the data centers capable of fulfilling the data operation request for the client, the control module further configured to send the data operation request to one of the data centers from the plurality of data centers based on a comparison of sets of data center cooling efficiency factors for each of the plurality of data centers, each data center cooling efficiency factor comprising data relating to operational costs of a data center, the control module selecting the one of the data centers in response to receiving the data operation request from the client.

17. The system of claim 16, wherein the client, the control module, and each of the plurality of data centers are geographically separate from each other and are in communication over a data network.

18. The system of claim 16, wherein the control module is collocated with one of the data centers.

19. The system of claim 16, wherein the control module compares the sets of data center cooling efficiency factors using a product of differentials between relative factors of data centers comprising the plurality of data centers.

20. A computer program product comprising a non-transitory computer readable medium having computer usable program code executable to perform operations for distributing data requests between data centers, the operations of the computer program product comprising:
- receiving a data operation request from a client, the data operation request corresponding to mirrored data stored at a plurality of data centers, each of the data centers capable of fulfilling the data operation request for the client;
- maintaining a set of data center cooling efficiency factors for each of the plurality of data centers, each data center cooling efficiency factor comprising data relating to operational costs of a data center, at least one of the data center cooling efficiency factors comprising a data storage device efficiency percentage comprising a percentage of data storage devices in a data center that comprise one or more efficient types of storage devices; and
- selecting, in response to receiving the data operation request, a data center from the plurality of data centers to fulfill the data operation request, the selection based on a comparison of the data center cooling efficiency factors.

21. A method for distributing data requests between data centers, the method comprising:
- receiving a data operation request from a client, the data operation request corresponding to mirrored data stored at a first data center and a second data center, both the first data center and the second data center capable of fulfilling the data operation request for the client, the first data center geographically separated from the second data center;
- comparing data storage device temperatures of the first data center and the second data center to determine a data storage device temperature differential;
- comparing ambient indoor temperatures of the first data center and the second data center to determine an ambient indoor temperature differential;
- comparing electricity costs of the first data center and the second data center to determine an electricity cost differential;

comparing data storage device efficiencies of the first data center and the second data center to determine a data storage device efficiency differential;

multiplying nonzero values of the data storage device temperature differential, the ambient indoor temperature differential, the electricity cost differential, and the data storage device efficiency differential to get a result;

selecting, in response to receiving the data operation request, one of the first data center and the second data center based on a relationship between the result and a predetermined threshold value; and sending the data operation request to the selected data center.

22. The method of claim 21, further comprising receiving data storage device temperature information and ambient indoor temperature information from one or more temperature sensors disposed at the first data center and the second data center.

23. The method of claim 21, further comprising updating electricity cost information and data storage device efficiency information based on user input.

* * * * *